(12) United States Patent
Albertelli et al.

(10) Patent No.: US 11,904,557 B2
(45) Date of Patent: Feb. 20, 2024

(54) COMPOSITE PRODUCTS

(71) Applicant: ACELL INDUSTRIES LIMITED, Cork (IE)

(72) Inventors: Aldino Albertelli, London (GB); Michael Frieh, London (GB)

(73) Assignee: ACELL INDUSTRIES LIMITED, Cork (IE)

( * ) Notice: Subject to any disclaimer, the term of this patent is extended or adjusted under 35 U.S.C. 154(b) by 0 days.

(21) Appl. No.: 17/014,835

(22) Filed: Sep. 8, 2020

(65) Prior Publication Data

US 2021/0162703 A1 Jun. 3, 2021

Related U.S. Application Data

(63) Continuation of application No. 12/681,161, filed as application No. PCT/GB2008/003371 on Oct. 3, 2008, now Pat. No. 10,800,135.

(51) Int. Cl.
| | |
|---|---|
| *B32B 5/18* | (2006.01) |
| *B29C 70/08* | (2006.01) |
| *B32B 15/04* | (2006.01) |
| *B32B 7/12* | (2006.01) |
| *B29C 70/46* | (2006.01) |

(Continued)

(52) U.S. Cl.
CPC .......... *B29C 70/086* (2013.01); *B29C 70/46* (2013.01); *B32B 5/18* (2013.01); *B32B 7/12* (2013.01); *B32B 15/046* (2013.01); *B29K 2105/043* (2013.01); *B29K 2105/045* (2013.01); *B29L 2031/724* (2013.01); *B32B 2305/022* (2013.01); *B32B 2419/00* (2013.01); *B32B 2607/00* (2013.01); *Y10T 156/10* (2015.01); *Y10T 428/24339* (2015.01); *Y10T 428/24521* (2015.01); *Y10T 428/249953* (2015.04); *Y10T 428/249955* (2015.04)

(58) Field of Classification Search
CPC .......................... Y10T 428/24339; B32B 5/18
See application file for complete search history.

(56) References Cited

U.S. PATENT DOCUMENTS

| | | |
|---|---|---|
| 3,620,900 A | 11/1971 | Williger |
| 3,900,650 A | 8/1975 | Sedore |

(Continued)

FOREIGN PATENT DOCUMENTS

| | | |
|---|---|---|
| DE | 19814039 A1 | 10/1999 |
| EP | 0251267 A1 | 1/1988 |

(Continued)

OTHER PUBLICATIONS

Dr. Punmia et al., "Mechanics of Materials", 20.1., p. 687, Laxmi Publications (P) Ltd (2001).

(Continued)

*Primary Examiner* — William P Watkins, III
(74) *Attorney, Agent, or Firm* — Merchant & Gould P.C.

(57) ABSTRACT

A method of forming a composite product is described. An example of the method comprises providing a layer (34) comprising a sheet-form moulding material and providing a substrate (36). The layer of sheet-form material is applied onto a surface of the substrate (36); and pressed to the substrate in a mould (30). In some examples, the substrate (36) is an open celled foam and gas and/or vapour can be displaced from the pressing region.

23 Claims, 7 Drawing Sheets

(51) Int. Cl.
  *B29L 31/00* (2006.01)
  *B29K 105/04* (2006.01)

(56) References Cited

U.S. PATENT DOCUMENTS

| | | | |
|---|---|---|---|
| 3,924,728 | A | 12/1975 | Brown et al. |
| 4,034,137 | A | 7/1977 | Hofer |
| 4,042,746 | A | 8/1977 | Hofer |
| 4,157,416 | A | 6/1979 | Cobb |
| 4,753,837 | A | 6/1988 | Hanusa |
| 4,764,238 | A | 8/1988 | Dastin et al. |
| 5,494,737 | A | 2/1996 | Sakai et al. |
| 5,589,016 | A | 12/1996 | Hoopingarner et al. |
| 5,863,365 | A | 1/1999 | Bird |
| 6,225,380 | B1 | 5/2001 | Pezron et al. |
| 6,311,542 | B1 | 11/2001 | Sloman |
| 6,553,734 | B1 | 4/2003 | McKague, Jr. et al. |
| 6,706,370 | B1 | 3/2004 | Ito et al. |
| 7,179,517 | B2 * | 2/2007 | Jones ............... B29C 70/46 156/286 |
| 2003/0088007 | A1 | 5/2003 | Wool et al. |
| 2004/0265567 | A1 | 12/2004 | Janzen |
| 2006/0070347 | A1 | 4/2006 | Gupta et al. |
| 2007/0054107 | A1 | 3/2007 | Hammond et al. |
| 2007/0119075 | A1 | 5/2007 | Schindler et al. |
| 2007/0148471 | A1 | 6/2007 | Rukavina et al. |

FOREIGN PATENT DOCUMENTS

| | | |
|---|---|---|
| GB | 1539240 A | 1/1979 |
| GB | 2401900 A | 11/2004 |
| GB | 2464541 A | 4/2010 |
| JP | 50-34665 A | 4/1975 |
| JP | 57-15921 A | 1/1982 |
| JP | 58-12859 B2 | 3/1983 |
| JP | 10-052901 A | 2/1998 |
| JP | 11-010820 A | 1/1999 |
| JP | 2010-234658 A | 10/2010 |
| WO | 99/50341 A1 | 10/1999 |
| WO | 02/055384 A2 | 7/2002 |
| WO | 2009/044169 A2 | 4/2009 |

OTHER PUBLICATIONS

Handbok of Thermoset Plastics, Polyurethanes, p. 285 (2014).
Rawlings, "Materials Science and Engineering", Encyclopedia of Life Support Systems, vol. II (2009).
Design Engineering Manual, Elsevier Ltd. (2010).
Examination Report for corresponding Indian Patent Application No. 26228/DELNP/2010, dated Mar. 31, 2017.
Office Action for corresponding Korean Patent Application No. 10-2010-7009675, dated Apr. 28, 2017.
Ralph et al., "Mechanics of Composite and Multi-functional Materials", vol. 7: Proceeding of the 2015 Annual Conference on Experimental and Applied Machanics Chapter 11, Springer, p. 89 (2016).
Pilla "Handbook of Bioplastics and Biocomposites Engineering Applications", Wiley, Scrivener, p. 272 (2011).
Dodiuk et al., "Handbook of Thermoset Plastics", Third Edition, Plastic Design Library, Elsevier, p. 285 (2013).

* cited by examiner

COMPOSITE PRODUCTS

This invention relates to composite products, for example laminate products. Preferred aspects of the invention relate to laminates comprising a foam substrate and a skin on a surface of the substrate. Preferred aspects of the invention relate to the production of laminated panels, for example for use in building, in furniture and as architectural components, for example architectural mouldings, although the invention has wide application to a broad range of composite products. Aspects of the invention described relate to doors, windows and other panels, in particular those used in buildings.

Doors, windows and panels have traditionally been made from wood, and may be glazed or unglazed. However, unless specially treated, wood can warp if exposed to changes in temperature and/or humidity. This can be disadvantageous aesthetically and can also lead to difficulties in opening and closing the doors, windows and partitions. The latter are particular problems in the light of modern building safety regulations, where warped doors, windows and panels can constitute a fire hazard. Furthermore, wood can be relatively expensive to obtain and there are major environmental concerns in respect of the use of certain types of wood.

Over the last few decades there has therefore been a trend towards providing artificial doors, panels and windows. One type of artificial door is a moulded door. Moulded doors can be formed by a number of different methods.

Foam resin laminate panels of the kind comprising a foam resin layer and a skin are being employed increasingly in the building, decorating and furniture industries because of the wide range of useful properties achievable.

In a known method of forming panels, the panels comprise a pair of outer skins and an internal foam core. The skin or skins and the foam core are formed separately and may then bonded together by means of an adhesive or by heat. However, some adhesives fail under certain conditions, leading to delamination, and others are difficult to apply or require the use of carefully controlled conditions for example because components in them are considered to be toxic or otherwise a hazard to health. In yet other cases, components in the adhesive adversely affect one or both of the layers to be bonded for example due to a chemical attack or to local solvation of the layer. Likewise, the use of heat for bonding is limited because it is only suitable where at least one of the layers is of heat-softenable material and neither layer is adversely affected by the temperature required for the effective heat treatment. Further, the bonds obtained with some materials by heat are not strong enough or tend to deteriorate with age.

Moreover such methods are not economic for the production of panels, such as panelled doors or reproduction wall panelling, which have a deeply profiled surface, because they involve separately forming suitably profiled core and skin members and this can involve using expensive moulds.

In known systems, the skins may be formed by compression moulding of a sheet moulding compound (SMC). The SMC includes a thermosetting resin, for example a polyester resin, together with reinforcing fibres, for example glass fibres.

To make the formed skin, the sheet moulding compound is folded to form a block of charge and placed into a preheated moulding cavity. The mould is closed and pressure is applied to press the moulding compound so that it spreads to all parts of the mould. Heat and pressure is applied until the moulded material has cured. The mould is then opened and the formed skin is removed.

The shaped skins can then be secured to opposite sides of a frame, prior to injecting a foam into a cavity located between the skins. The foam acts as a filler and can assist in providing increased improved rigidity and insulation the door. The door can then be finished as appropriate.

However, although this method can be effective, it is not always reliable. This is because the curing of foam and the filling of the cavity is difficult to control accurately. Furthermore, the rheological properties of the curing foam can be adversely affected by wire mesh reinforcements, which are often provided between the skins in order to strengthen the resultant product.

There are further disadvantages associated with the forming of the SMC skins using such a method. For example, the SMC needs to be folded to form a block in the mould cavity. This is because of air trapped in the mould cavity and gases formed during the curing reaction need to be released during the moulding operation.

Also, high pressure is required to effect the moulding; pressures of 1000 to 1200 tonnes are not unknown.

This places constraints on the materials which can be used for the mould itself. In such arrangements, stainless steel moulds are used, but these are expensive and they are slow to heat, leading to long set-up times before the required mould temperature is reached. For example, heating a stainless steel mould to 140 degrees needed for compression moulding might take several hours. In addition, stainless steel moulds are heavy, and changing a mould for the forming of a different skin profile might take half a day including the cooling, mould changing and heating-up cycle. Therefore, such compression moulding processes have in the past generally been used to produce high volume products due to investment in making the mould and the downtime in changing moulds.

Also another disadvantage with this method is that where the skin is subsequently adhered to a core with adhesive, or filled with foam to form a foam laminate structure, structural failure of the bond between the skin and the core can be a problem.

An object of the present invention is to provide an improved composite product and method of forming a composite product.

According to an aspect of the invention, there is provided a method of forming a composite product, the method comprising: providing a layer comprising a sheet-form moulding material; providing a substrate; applying the layer of sheet-form material onto a surface of the substrate; and pressing the sheet-form material to the substrate, wherein the configuration of the substrate is such that gas and/or vapour can be displaced from the pressing region.

Preferably the pressing region is that area where the surface of the substrate and the sheet-form material are being pressed together, preferably in the region of the interface of the substrate and the material.

By removing gas or vapour that might otherwise remain and/or build up in that region, it has been found that the pressure required to form the composite product can be significantly reduced in some examples.

Preferably the nature of the surface of the substrate is such that the gas or vapour can escape from the pressing region. For example, a region at at least a part of the surface of the material is preferably porous to allow for the displacement of gas or vapour from the relevant areas.

Preferably the substrate is such that gas or vapour can escape from the pressing region in a direction having at least a component in a direction generally transverse to the pressing direction in which the sheet-form material is pressed to the substrate.

Other formations (as an alternative or in addition) may be provided to assist the displacement of the gas. For example, grooves or channels could be formed in the substrate.

The configuration of the substrate which allows for the displacement of the gas may be inherent in that it arises from the nature of the composition of the substrate itself, and/or it may be provided by subsequent action, for example by machining the substrate or by chemical action on the substrate.

Preferably the configuration of the substrate is such that it can release pressure in the pressing region.

Preferably the substrate includes a material having a cellular structure. A cellular structure of the substrate can provide the necessary displacement of the gases in some arrangements. In preferred examples, the substrate comprises a material including a substantially open-celled structure. In this way, good movement of the gases away from the pressing region can be obtained in some examples. The substrate may comprise a foam material.

According to a further aspect of the invention there is provided a method of forming a composite product, the method comprising: providing a layer comprising a sheet-form moulding material; providing a substrate comprising a foam material including a substantially open-celled structure; applying the layer of sheet-form moulding material onto a surface of the substrate, and applying pressure to bond the sheet form material to the substrate.

Preferably the product comprises a laminate product. The laminate product according to the present invention may comprise for example a core having one skin applied to a surface, or may comprise a core sandwiched between two skins. Other arrangements are possible.

The substrate then can form a part of the final product, or it is envisaged that the substrate might be removed, for example by machining, after the skin has been formed. Preferably the substrate forms a part of a final product derived from the composite product.

In some embodiments of the invention, the sheet-form material is applied directly to the substrate. In other examples, one or more layers may be provided between the substrate and the sheet-form material, for example to enhance adhesion or bonding of the two parts. For example an adhesive might be applied between the parts.

Preferably the method includes the step of applying the layer of sheet-form moulding material to a mould, the method further including the step of pressing the substrate to the sheet-form material to the mould.

By providing the matrix in the form of a sheet, the use of liquid resin can be avoided. This can give considerable time savings in the manufacture of the product, as well as benefits regarding the ease of use of the matrix material and a reduction in the manpower and equipment required to apply the matrix material or pre-polymer to the mould.

The method may include the step of applying the layer directly to a surface of a mould.

In other examples, one or more further layers might be applied between the sheet-from material and the tool surface itself. In some examples, materials might be applied to the tool surface, for example to assist moulding and/or release of the product from the mould. A coating composition may be applied to the mould which forms a coating on the product after moulding. The composition may be coloured. The composition may be applied to the mould in the form of a powder, for example using an electrostatic method.

Preferably the method further includes the step of providing a veil between the sheet-form moulding material and a surface of the mould.

Preferably the veil comprises a sheet of material which is provided between the sheet-form moulding material and the mould surface before moulding. The provision of the veil preferably gives rise to improvements or changes in the surface finish of the moulded article compared with an arrangement in which the veil is not present.

For example, where the sheet of moulding compound comprises a reinforcing component, preferably the veil acts to prevent or reduce the amount of the reinforcing component at the surface of the resulting moulded product. For example, where the moulding compound comprises SMC including short glass fibres, it has been found in some situations that the glass fibres on moulding can project from the surface of the moulded product giving a disadvantageous surface finish. By using a veil, it can be possible to provide a barrier to certain components of the moulding material, for example so as to improve surface finish.

In some examples, it is thought that the use of a veil has the effect of reducing movement of the matrix material in the plane of the mould. It is a preferred feature of the aspects of the present invention that the movement in the plane of the mould surfaces is reduced; it is thought that this gives better finish to the moulded products in some arrangements.

The veil is preferably substantially pervious to a component of the moulding material during the moulding.

In this way, a component, for example a resin component, of the moulding material can pass through the veil during moulding so that a resin finish at the surface of the moulded product can be formed.

Therefore, the material for the veil is preferably chosen so that it is sufficiently pervious to certain components of the moulding compound (in particular the resin), while providing a barrier function for certain other components for example glass fibres or other reinforcements.

In some arrangements the veil can be placed directly adjacent to the mould surface and there will be sufficient penetration by the resin components for a satisfactory surface finish to be produced. However, it is envisaged that a further layer may be provided between the veil and the mould surface to improve the surface finish. For example a layer of resin material may be provided on the surface of the mould. This may be applied by any appropriate method.

Alternatively, or in addition, the veil layer may comprise additional components, for example resin material to improve surface finish.

The veil may comprise a non-woven material. In particular where the veil is applied directly to the mould, it may be desired for the veil material not to have a particular texture or finish, which might form a perceptible surface structure at the surface of the moulded product. However, in other arrangements, such a surface structure or pattern at the surface may be an advantageous feature.

Where such a structure is not desired, preferably the veil comprises a non-woven material. For example, preferably the veil does not comprise a knitted or woven surface, although in some cases such a material could be used, in particular if a surface treatment had been provided to reduce the surface structure of the veil material. For example, in some arrangements, the veil might comprise a fleece or brushed surface. However, for most applications, preferably at least one surface of the veil material has substantially no surface structure or pattern.

The veil may comprise a felt cloth. For example the veil may comprise a polyester material. Alternative materials could be used, for example comprising wool, polyethylene, polypropylene or PET. The veil might comprise a fleece material, or might comprise a foam material. As indicated above, a suitable material preferably is pervious to the resin to be used, and has a suitable surface texture.

The veil may comprise a polyester material, having a weight of about 120 to about 150 g/m2.

A broad aspect of the invention provides a method of moulding using a sheet moulding compound comprising a resin and a filler component, the method comprising applying a veil between the sheet moulding compound and a moulding surface. As discussed above, preferably the veil has the effect of a barrier to the filler component while allowing passage of the resin material, for example by absorption.

By applying a sheet-form material to a substrate comprising an open-celled structure, several advantages can be achieved in examples of this aspect of the invention.

In particular, by using an open cell foam substrate, air in the mould and gases produced during the moulding process can pass into and through the open cell structure of the foam so that the risk of the air and gases leading to flaws and other deformities in the skin are reduced.

Furthermore, by bonding the sheet-form material to the substrate in the moulding process, efficiencies in manufacture of the laminate product can be achieved since in some examples, a further step to adhere the skin to a core might be avoided.

In some examples, it will be arranged that the formulation of the sheet form material is such that there is the desired flow of the moulding material into the surface of the substrate. In some examples, this will be achieved by there being excess prepolymer material in the composition, for example compared with corresponding compositions for other applications.

Thus the thickness of the skin formed may be self regulating in that the moulding operation will compress the sheet-form material to a predetermined thickness, and the excess resin will flow into the substrate. Also, less accuracy in the formulation of the sheet form material is required, since any excess prepolymer in the composition will be removed into the substrate on the moulding step.

In preferred examples, the material of the sheet-form material passes into the cells or other formations of the substrate material during the moulding process and provides a mechanical bond between the substrate and the moulded skin. This can reduce the risk of delamination of the skin from the substrate core, provide a stable product when exposed to heating/cooling cycles and provides a monolithic composite structure without the need for an adhesive to be applied or the assembly of parts.

In preferred examples, the sheet-form material forms an outer skin on the substrate, which is mechanically keyed into substrate giving a good bond between the skin and the substrate. In some cases it has been found that the bond achieved at the interface of the skin and the substrate is in fact stronger then the material of the substrate itself.

A laminate product made by this method may fail within the substrate layer, and not at the interface.

Preferably the method includes applying heat and pressure to the substrate and the sheet-form material. Preferably the sheet-form material is cured directly onto the substrate. This important feature may be provided independently. A broad aspect of the invention provides, curing a sheet of curable material directly onto the surface of a substrate, preferably a substrate configured to displace gas or vapour from the interlace region, preferably the substrate comprising an open-cell foam.

Preferably the sheet-form material comprises a thermosetting material, the method including the step of causing or allowing the material to cure.

Preferably the method comprises a method of compression moulding.

Preferably the pressure and temperature and cycle time are chosen so that the sheet-form material sets in the mould.

Preferably the mould is profiled to produce the desired shape of skin.

A contoured surface of the composite product can be obtained. For example the surface of the product may include depressions formed during the pressing step as the components are pressed onto the mould. Thus moulded composite products can be formed.

It is envisaged that the methods of the present invention can be used to form products having no surface mouldings, for example flat panels. In this case, the substrate may comprise any suitable material. Preferably the substrate comprises a rigid material so that the pressing step can be carried out most successfully and the substrate can provide desired mechanical properties to the product.

In some examples, where a contoured surface is required, the required contours or mouldings can be formed on the surface of the substrate. For example, the required shape may be formed in the substrate by machining, for example, a substrate block comprising polyurethane foam.

The shape of the mould is matched to the contours of the substrate so that when the components are pressed onto the mould surface, the resulting panel has the skin having the required contours bonded to the shaped substrate.

However, preferably the substrate comprises a crushable material such that, during the application of pressure step, a surface of the substrate is moulded.

The substrate may comprise a frangible material. Such a material may be rigid and non-crushable in the normal use of the resulting product, but during the pressing step, the substrate material can be crushed to mould the substrate. Where a mould surface is used, the substrate material can be crushed so that its surfaces facing the mould conform to the contours of the mould surface.

This feature is particularly advantageous and is provided independently. Therefore, an aspect of the invention provides a method of forming a composite product, the method comprising; providing a layer comprising a sheet-form moulding material, and providing a substrate including crushable material, applying the layer of sheet-form material onto a surface of the substrate, and pressing the sheet-form material to the substrate, wherein at least part of the substrate is crushed during the pressing step.

Preferably at least part of the substrate is moulded during the pressing step.

Preferably the method includes providing a mould surface and applying first the polymer sheet and then the crushable substrate to the mould (optionally with other layers or components being provided), the substrate being moulded to correspond to the shape of the mould surface.

Preferably the substrate includes material which is non-resiliently crushable; preferably the deformation of the substrate material during pressing is substantially plastic, that is substantially permenant and non-recoverable. Thus once the substrate has been crushed, it remains in its crushed shape.

This method is particularly advantageous in some examples. In particular, it can remove the requirement to machine the required contours into a surface of the substrate before the application of the skin.

Simple blocks of the substrate can be used in the method to form shaped or moulded products.

The moulding may provide surface contours of the product, and/or may provide the shape of the product itself. It is envisaged that shaped products could be formed using this method.

In examples described, the substrate comprises a plastics material, but other any other suitable material could be used.

It is envisaged that the invention might be applied where the substrate comprises a material which is rigid even on the application of pressure, but preferably the substrate comprises a material which can be controllably crushed during application of pressure so that a surface of the substrate can take on the contours of a part of the mould.

In this way, moulded laminated products can be efficiently produced in a single step from a sheet moulding material and a block of substrate material.

In some preferred examples, the substrate may be provided with two skins in a single pressing step, preferably the substrate being moulded in accordance with the shape of two opposing mould surfaces. The two mould surfaces may have different profiles, or the same profile.

In some examples, part or all of the core may be crushed to have substantially zero thickness.

In examples of the present invention, the substrate material preferably comprises a rigid foam, for example a foam material obtained by causing or allowing a mixture of phenolic resole, acid hardener and finely divided particulate solid to cure under conditions in which foaming for the mixture is caused primarily or solely by volatilisation of small molecules present in the resole or formed as a by-product of the curing reaction. The formation of an example of such foams is described in detail in EP 0010353 and foamed bodies comprising these foams can be obtained as ACELL foam from Acell Holdings Limited, UK.

Preferably the substrate material has a density in the range of 100 to 500 kg/m3, more preferably 120 to 400 kg/m3 and most preferably 120 to 250 kg/m3. It has been found that such foams can be caused to reproduce on a face thereof the detail of even quite fine and complex mould surfaces by the application of a suitable pressure the level of which depends on the nature and density of the foam material but can readily be determined by simple experiment.

Such a substrate has a substantially open-cell structure so that as the layer of sheet-form material is pressed into the cells or pores of the material, the gas or vapour therein can be readily displaced.

While any suitable material may be employed, aspects of the invention are particularly suitable for use with substantially rigid structural materials, for example foams, that is, preferably self-supporting foams which are resistant to deflection under load and do not collapse under moderate pressure. The physical properties of such foams, especially the compressive strength and deflection under load are believed to be related to (amongst other factors) cell wall thickness. In some examples, the cell size for suitable substrate material is found to be in the range of about 0.5 mm to 5 mm, more preferably 0.5 or 1 mm to 2 or 3 mm.

It is preferred for the substrate to include a filler material, for example a finely divided filler material. Foamed phenolic resin reinforced with a finely divided filler is particularly preferred in some arrangements because of the excellent combination of physical properties and fire resistance that can be obtained for laminates formed from it.

Preferably at least some of the cells or pores of the foamed substrate are open to the surface of the face on which the layer of sheet-form material is to be applied, and preferably the open out below the surface to a greater width than the opening, thereby providing an undercut which can enhance the keying of the layer material to the substrate.

In some examples, the thickness of the layer of sheet-form material provided on the substrate will be at least 1 mm but thicknesses of less than 1 mm are also contemplated. If desired, the thickness of the layer of material may be reduced before or after setting.

In some examples a further layer of sheet-form moulding material is applied to an opposing surface of the substrate, the application of pressure sandwiching the substrate between the two layers of sheet-form material.

In this way, a laminate product including a skin on two sides can be formed. For example, were the product comprises a door, both sides of the door can be formed in a single step.

The sheet form material preferably includes a thermoset. The material may include further components, for example components to enable the material to be handled in sheet-form.

The sheet-form material of aspects of the invention, may include any appropriate matrix composition. For example, the matrix may include one or more of a thermosetting polymer, for example an epoxy resin, a phenolic resin, a bismaleimide or polyimide, and/or any other suitable material. The material may include melamine, which is useful as a fire retardant. The matrix materials may further include hardeners, accelerators, fillers, pigments, and/or any other components as required. The matrix may include a thermoplastic material.

The sheet-form material may comprise reinforcement, for example reinforcing fibres. The sheet-form material may include glass fibres.

Preferably the layer of sheet-form moulding material comprises SMC (sheet moulding compound).

The SMC may comprise two main components: a matrix and a reinforcement.

The matrix preferably comprises a resin which preferably includes polyester, but may include vinyl ester, epoxy, phenolic, or a polyimide. Preferably the matrix comprises a thermosetting resin.

The matrix may further comprise additives, for example minerals, inert fillers, pigments, stabilizers, inhibitors, release agents, catalysts, thickeners, hydrating additives and/or other suitable materials.

The reinforcement preferably comprises glass fibres. The fibres may be cut, for example into lengths of 5 cm or less, or may be continuous. Other reinforcement materials could be used, for example carbon fibres.

There are benefits in using SMC. For example, SMC has low density but favourable mechanical properties compared with other materials for example thermoplastics and also exhibits good thermal properties. Of particular importance for some applications, for example building applications, resistance to fire is good. SMC also shows good noise reduction qualities, also important where used as a building material and good chemical resistance.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. The material may include short fibres. Fibres may provide a continuous filament winding. More than one layer of fibres may be provided.

The fibres may include one or more materials. For example the fibres may include one or more of carbon fibres, glass fibres, aramid fibres and/or polyethylene fibres. Kevlar® fibres may be used. Products including such fibres could be used for protective devices and building products. For example, some products of the present invention may find application as armoured or bullet-proof products. For example, protective panels may be formed having Kevlar® fibre reinforcement.

The sheet-form material may comprise an impregnated fibre composite material.

Surprisingly, it has been found that sheet-form materials including long fibres can be used in the methods of the present invention, and also sheet-form materials including fibres which are woven together can be used. Without wishing to be bound by theory, it is thought that such materials having relatively long fibre reinforcements and/or including fibre mats or other networks or structures can be used because the movement of material in the mould in a direction along the mould surface is relatively low.

Alternatively or in addition to reinforcement being provided as an integral part of the sheet-form material, reinforcement may be provided as a separate layer, for example arranged between the sheet-form material and the substrate.

Where the separate layer of reinforcement is provided, it may be located across the whole of the substrate, or may for example be provided in only parts. For example, if there is a particular section of the product which is more susceptible to damage or attack, additional reinforcement can be provided in that region. For example, where the product is to be used in a door, additional reinforcement may be provided at regions of the door which are thinner than others for due to decorative moulding or other features and/or at regions of the door which are more susceptible to damage.

Thus the arrangement may include sheet-form material having integral reinforcement, for example short fibres and/or longer fibres which may be arranged as fabrics or mats, for example. In addition, or alternatively, reinforcement may be provided as one or more layers separate from the sheet-form material. The additional layer of reinforcement may include short and/or long fibres, for example of materials mentioned above.

During the pressing or moulding, preferably the matrix material, for example resin, flows into the structure of the fabric or other arrangement, to form a bond.

Preferably the layer of sheet-form material comprises a curable composition. In some examples of the invention, the sheet-form material might be settable other than by curing.

Preferably the pressure and heat is chosen such that the sheet-form material is moulded and then sets in the mould.

Preferably the viscosity of the sheet-form material is reduced during the pressing step.

Preferably the sheet-form material is one that reduces in viscosity and or at least partially liquefies on the application of heat and/or pressure. In this way, some flow of the material in the mould can be achieved. This can lead to improved moulding of the material, more uniform thickness and/or reduction of moulding defects. Preferably, the material at least partly flows into cells of the substrate material during the pressing step. Preferably the material and substrate are such that the material only partly flows into the substrate during the moulding step so that good bonding between the skin and the substrate is obtained while retaining a suitable skin thickness for the required mechanical and other properties of the laminate.

Preferably the sheet-form material is applied as a single thickness.

Preferably the material, for example the SMC is applied to the mould in unfolded form. This leads to ease of manufacture, and also can reduce the pressure required for the moulding step. As discussed further herein, a plurality of single thickness layers may be provided, the layers preferably overlapping at the edges to reduce the risk of gaps being formed in the skin.

Preferably the sheet-form material is applied to substantially a whole mould surface.

Having the SMC extend substantially across the full area of a mould face has a number of advantages. For example, in some arrangements, the pressure required to complete the moulding step can be reduced by reducing the amount of lateral flow required of the material in the mould. Also, by reducing the amount of flow of material across the mould surface, abrasion and/or wear of the surface of the mould can be reduced. In this way, the material used for the mould can be selected from a wider range of candidate materials as discussed in more detail below.

The sheet-form material can be applied to the mould as a single piece of material.

Preferably a plurality of sheets of sheet-form material is applied to a mould surface.

In some arrangements, for example because the mould surface is large, or to improve the ease of handling the sheet-form material, several pieces of sheet-form material can be applied to the mould and/or the substrate. Preferably an edge of one sheet overlaps with an edge of an adjacent sheet. In this way, the risk of gaps being formed in the skin on the substrate is reduced. The additional material at the overlapping region has been found not to lead to reduced quality of the finished product: any excess material in that region can, in some examples, into the substrate and/or laterally within the mould.

Thus in some examples, in particular where complex shapes are to be formed, several pieces of sheet-form material can be provided.

This feature is further advantageous because it can lead to a reduction in the amount of potentially waste sheet-form material. Smaller pieces of material, for example off cuts from larger pieces or cut outs (for example if a panel is to include a glazed section) need not be disposed of but can be used.

Preferably the pressure applied is pressure is less than 200 tonnes, preferably less than about 100 tonnes.

As discussed above, traditional SMC manufacturing processes requires enormous pressure to evacuate the air trapped during the forming of the SMC product. By putting the foam substrate behind the SMC skin prior to pressing, the air can escape though the cellular structure of the foam reducing greatly the abrasion on the tool surface. Also considerably lower pressures are required. Preferably the pressure is less than 500 tonnes, preferably less than 200 tonnes, preferably less than about 100 tonnes.

Preferably the sheet-form material is applied to a mould surface comprising aluminium or aluminium alloy.

Where lower pressures are used, aluminium tools can be used. This can give rise to low cost tooling, flexible production and less downtime due to tool change over in view of the reduced weight of an aluminium mould and speed of heating or cooling an aluminium mould compared with a stainless steel mould. For example, the volume of an aluminium tool could be significantly smaller than that of a corresponding tool of steel, and this combined with the lower density of aluminium leads to considerable weight advantages when using aluminium moulds.

Where reference is made herein to components being made of or comprising aluminium, preferably the relevant component includes aluminium or an appropriate aluminium alloy or other material including aluminium.

Preferably the sheet-form material is applied to a mould surface having a surface pattern.

As indicated above, the mould surface is preferably shaped for example to provide a profiled surface to the skin of the laminate. Alternatively, or in addition, a surface pattern may be provided on the mould to give a surface pattern or texture on the surface of the skin of the laminate.

For example, a pattern relating to the pattern of a woodgrain may be provided on the surface of the mould so as to form a pattern on the surface of the laminate skin resembling woodgrain. Other patterns might be provided to give an alternative finish to the skin.

A further important aspect of the invention provides a method of forming a composite product, the method comprising: providing a layer comprising a sheet-form moulding material; providing a substrate; applying the layer of sheet-form moulding material onto a surface of the substrate; and applying pressure to bond the sheet-form material to the substrate, wherein the substrate includes surface formations on at least a part of the substrate surface, so that the material of the sheet-form material keys with the formations to bond the material to the substrate.

The surface of substrate may include a plurality of hollows.

The formations may comprise hollows in the surface of the substrate to enhance the keying of the material to the substrate and hence the bonding of the material to the substrate.

The hollows or formations may be of any form such as to enhance the bonding of the material to the substrate. For example, there may be pits, cavities or pores in the surface, there may be channels or grooves. The pattern of the formations may be of any form whether regular or random, and the formations may extend across all the surface of the substrate or only over one or more sections of the surface.

Preferably at least some of the formations or hollows open out below the surface to a greater width that the opening at the surface. In this way an undercut can be provided which can enhance the keying.

The formations or hollows may arise from the nature of the substrate itself. For example, where the substrate comprises a foam, the formations or hollows may be provided by cells of the foam. Alternatively or in addition, formations or hollows may be formed in the surface of the substrate, for example mechanically or chemically. For example, pits could be machined into the surface of the substrate to improve keying.

Preferably the sheet form material is such that matrix material, for example the pre-polymer resin, extends into the surface of the substrate during the pressing. This can improve the bond between the skin and the substrate. Preferably the distance the matrix material extends into the surface is more than 10%, 20% 30% or even 50% of the thickness of the skin on the substrate. For example, more than 5%, more than 10% or more than 20% of the resin in the sheet-form material may flow into the substrate.

The formulation of the sheet-form material may be such that there is sufficient matrix-material in the composition to allow for there to be the desired volume of flow of the polymer into the surface of the substrate. This may require that the sheet-form material includes additional resin compared with that of a conventional sheet-form material.

According to a broad aspect of the invention there is provided a method of forming a composite product, the method comprising the steps of: providing a sheet-form curable material; providing a substrate; and pressing the sheet-form material to the substrate.

Preferably the sheet-form material includes a thermoset material.

Preferably the arrangement is such that gases can be released from the arrangement during the pressing step.

Preferably the surface of the substrate includes a plurality of pores or other surface formations so that the sheet-form material can flow so as to key mechanically to the substrate, for example as a result of the pores or formations. In this way, a strong interface between the skin and substrate of the resulting product can be achieved.

In some examples the substrate has a substantially open cell structure. The substrate may comprise an open cell foam material.

Preferably a single pressing step is used in the forming of the composite product. Preferably the complete finished product is formed by a method in which only one pressing or moulding step is used.

Preferably the substrate comprises a rigid crushable material. In this way, depressed regions in the laminate product can be formed by using a shaped moulding tool. Preferably the sheet-form material is provided on a surface of the tool, the substrate is provided on the sheet-form layer, and is pressed onto the tool surface.

An aspect of the invention provides a method of forming a composite product, the method comprising the steps of applying a sheet moulding compound to an open cell frangible substrate, and pressing the sheet moulding compound to the substrate to adhere the SMC to the substrate and to mould the substrate in a single step.

The method may include further providing a second layer of sheet-form curable material, the method including providing the substrate between the two layers, and pressing the two layers to the substrate.

The invention further provides a method of forming a laminate product, the method comprising the steps of: providing two layers of sheet-form curable material; providing a substrate between the two layers, the substrate optionally having a substantially open cell structure; and pressing the two layers of sheet-from curable material to the substrate.

In this way, a foam sandwich panel comprising a layer of foam between two skins can be made in a single pressing step.

The method may include the step of providing further components between the two layers of sheet form curable material.

Other components may also be sandwiched between the skins during the moulding process. For example where the product is a door, the door frame components, glazing panels and other components might be arranged in the mould so that they can be formed into the product in a single moulding step. It is envisaged that a substantially complete product, for example a door, could be made in a single moulding operation using the present invention.

A broad aspect of the invention provides, a method of forming a laminated product, for example a panel or door, the method comprising the steps of providing first and second layers of sheet-form moulding material, applying a substrate between the first and second layers, optionally further applying an additional component between the first and second layers, and applying pressure to the layers to bond the layers to the substrate to form the product.

To give improved rigidity, in the finished product (door, window or panel), in general the skins will be spaced not only by a core but also by a frame or frame members such as stiles, rails, and/or mullions. The frame members may be of wood, metal (for example, aluminium) or plastics (such as uPVC) or a combination of these, e.g. metal-reinforced plastics. The plastics material may contain filler, if desired, to improve hardness and/or rigidity.

In a preferred embodiment, the core occupies substantially the entire volume or volumes within the frame; i.e. substantially the whole space within the panel defined by the skins and the components of the frame. It is also preferred that the substrate is bonded to each skin over substantially the entire area of the substrate which is in contact with that skin, even when the skin includes one or more depressed zones, since this enhances the overall strength of the panel and the resistance to bowing.

In one preferred embodiment, the substrate is in the form of one or more blocks, for example rectangular blocks, held in a frame, at least one of the skins includes one or more depressed zones and the portion of the block or blocks behind each said zone conforms to the contours of said zone as a result of selective controlled crushing of the substrate in the area behind said zone.

The invention also provides a product formed by a method as described herein and an apparatus for use in a method as described herein.

Also provided by the invention is a product comprising a substrate and a skin of sheet form material bonded to a surface of the substrate, wherein material of the sheet-form material is mechanically keyed with the surface of the substrate. The substrate may have formations on its surface, the material keying with the formations. The substrate may be substantially open-celled the material extending into cells of the open-cell substrate.

The invention also provides a product comprising a substantially open-cell substrate and a skin of sheet-form material bonded to a surface of the substrate, and further provides a substrate for use in a method described herein.

Also provided by the invention is a moulding apparatus for use in pressing a sheet-form moulding material to a substrate, preferably a surface of the moulding apparatus comprising aluminium or aluminium alloy.

Where reference is made herein to the skin or layer being bonded to the substrate, it is to be understood that, preferably, at least a part of the skin or layer is so bonded. In some examples, the skin or layer etc will be attached over the whole of its interface with the substrate.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Preferred features of the present invention will now be described, purely by way of example, with reference to the accompanying drawings, in which.

Figure 1:
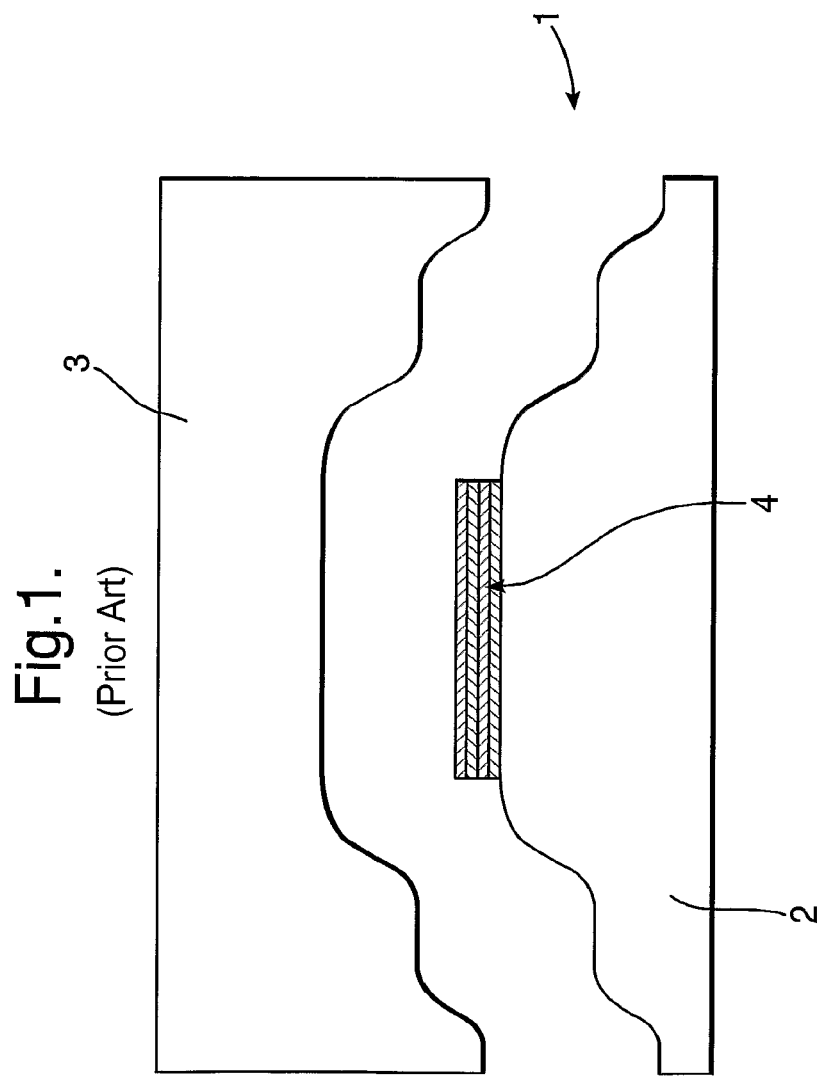
FIG. 1 shows apparatus for compression moulding of an SMC in accordance with a known method.

FIG. 1 shows a method of moulding a skin from an SMC. A mould 1 is provided comprising male 2 and female 3 mould sections. The mould sections 2, 3 are heated to a temperature of about 140 degrees C. The sheet moulding compound is folded to form a block of charge 4 which is placed in the mould. The mould sections 2, 3 are pressed together and the SMC spreads in the mould cavity. The mould sections are held together for sufficient time for cure of the compound to be completed and then the mould sections are parted to release the formed moulded skin.

To form, for example, a panel, two skins can be secured to opposite sides of a frame and foam is injected into a cavity between the skins.

FIGS. 2 to 7 illustrate the main steps in a method of forming a composite product.

Figure 2:
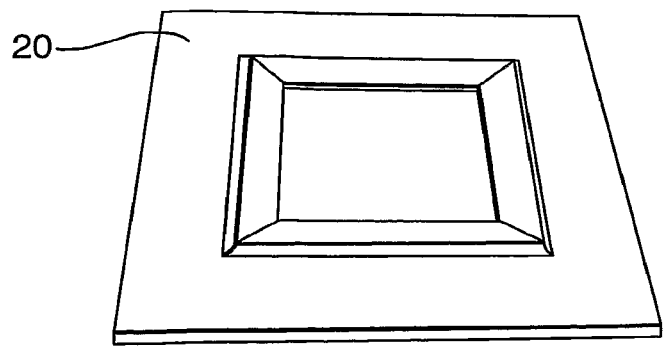
FIGS. 2 to 7 show steps in a method of forming a composite product according to an embodiment of the present invention.

FIG. 2 shows an aluminium mould 20. The mould comprises a surface contour suitable for moulding a door panel. The mould is heated to a temperature of approximately 140 degrees C.

Figure 3:
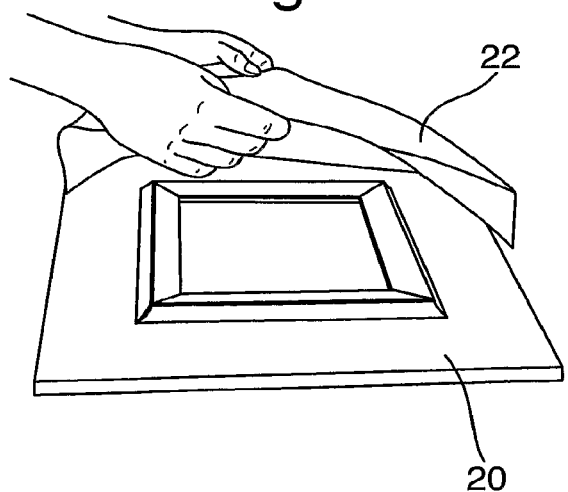
Figure 4:
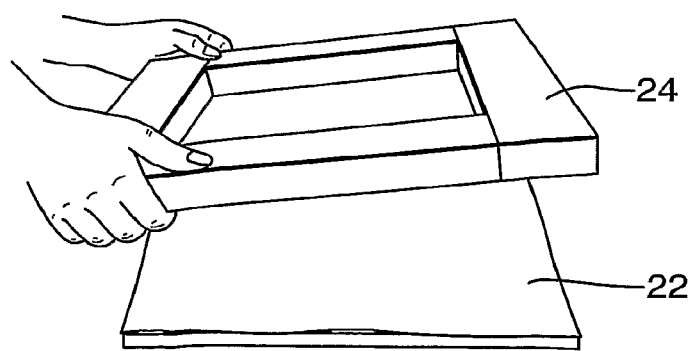

A sheet of sheet moulding compound 22 is applied to the upper surface of the mould 20 (FIG. 3). The sheet 22 is sized so as to extend across the whole mould surface.

Figure 5:
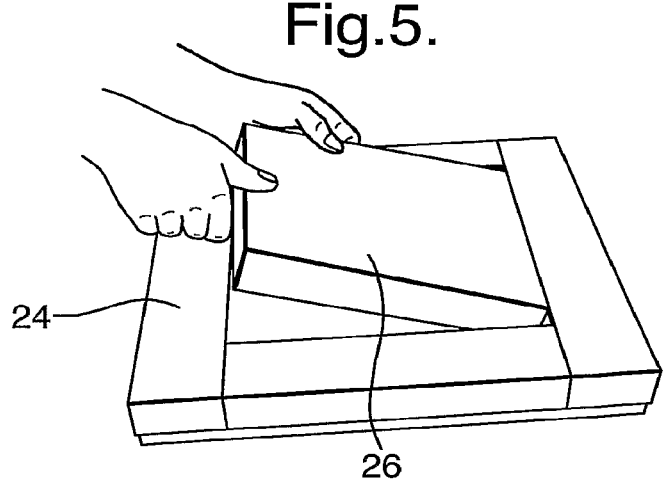

A wooden frame 24 is positioned onto the sheet 22 (FIG. 4) and a block of foam substrate 26 is inserted into the frame 24 (FIG. 5).

The substrate 26 may comprise a foam, for example as described in more detail below.

Such foam used is advantageously:
structural and has significant load bearing properties
frangible and can be formed under pressure and has no memory and therefore substantially retains its pressed form
open cell and therefore allows the migration of clues resins into the cells during door manufacture to create a truly monolithic composite structure.

In an example of the foam used, the cell size ranges from 0.5 to 3 mm and the density is 80 to 800 kg/m3.

Figure 6:
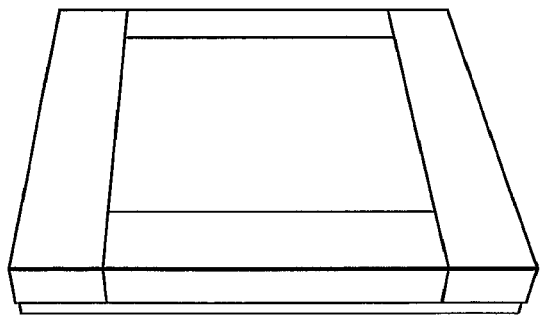

Downward pressure of about 100 tonnes is applied to the components (as arranged in FIG. 6—application of pressure not shown). The mould is pressed onto the substrate crushing the foam and moulding the surface of the substrate to the shape of the mould surface. The SMC sheet 22 is also pressed between the mould surface and the substrate. On the heated mould surface 20, the SMC begins to liquefy and flow into cells at the surface of the substrate 26. Air and other gases trapped between the SMC and the substrate passes through the open cell structure of the foam. The components are held in the mould with the application of pressure for a sufficient time for the SMC to cure for form a skin bound to the moulded substrate 26 and having an outer surface corresponding to the mould surface.

Figure 7:
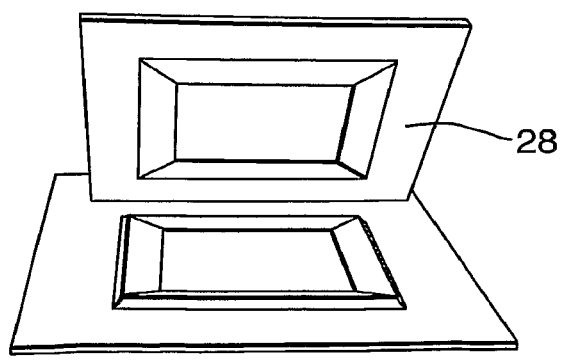

The composite product 28 is removed from the mould (FIG. 7). In this example, the cycle time for moulding the product is about 4 minutes.

It is seen that in this example, an upper mould portion is not required. In this example, the components are pressed against a single heated platen.

Figure 8:
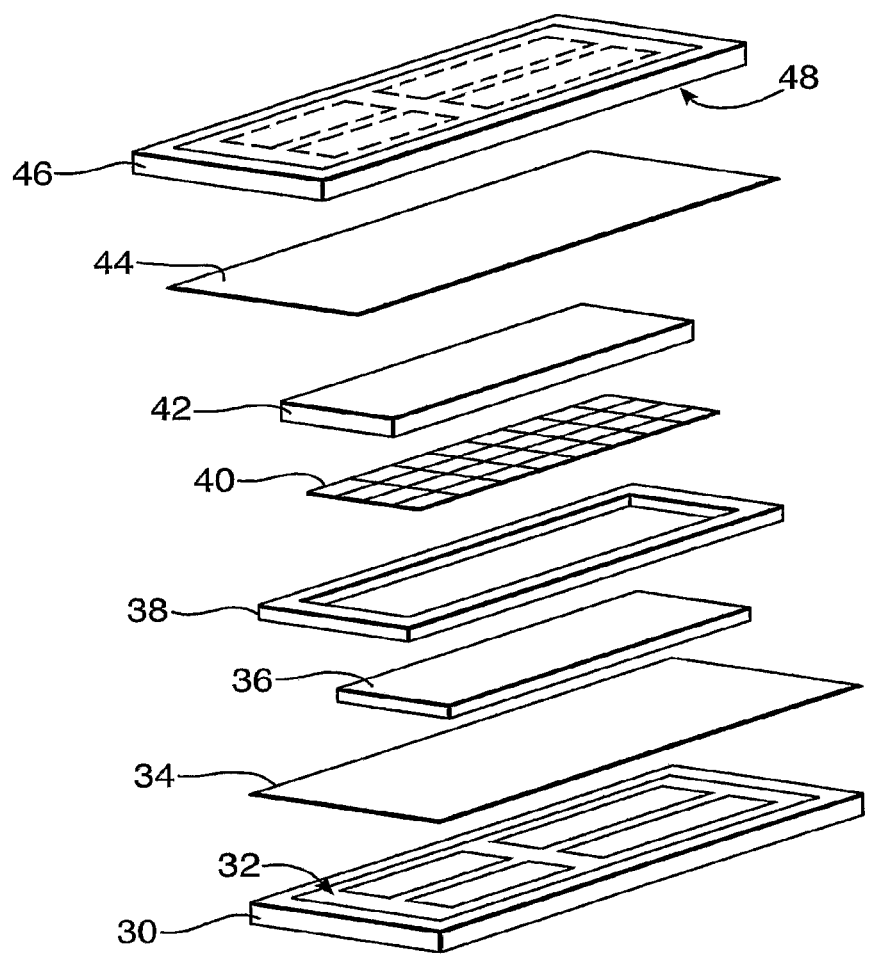
FIG. 8 illustrates the forming of a composite door.

Referring now to FIG. 8, a method is described in which a moulded door is formed in a single pressing step.

A lower mould 30 is provided and placed on a heated platen so that the mould reaches a temperature of about 140 degrees C. The lower moulding surface 32 of the lower mould 30 is contoured according to the surface shape of a panelled door.

A lower sheet 34 of curable material is applied to the lower moulding surface 32. The size of the lower sheet 34 is approximately the same as that of the lower moulding surface 32.

A lower foam block 36 comprising ACELL foam is applied to the upper surface of the lower sheet 34. A wooden frame 38 is placed around the lower foam block. Alternatively, the frame 38 could be applied first, and the block 36 inserted into the frame. A reinforcement sheet 40 comprising a metal grid is placed in the frame 38 onto the lower foam block 36. Onto the reinforcement sheet 40 and within the frame 38 is placed an upper foam block 42 also comprising ACELL foam. A layer of adhesive may be applied between the two blocks 36, 40 to aid bonding. Onto the upper foam block is placed the upper sheet 44 of curable material.

An upper mould 46 is provided having an upper moulding surface 48 contoured according to the surface shape of a panelled door. The upper mould 46 is heated to a temperature of about 140 degrees C.

The upper mould 46 is lowered onto the other components and pressure of about 100 tonnes is applied to press the upper mould 46 towards the lower mould 30.

The upper block 42 and the lower block 36 comprise frangible foam and the surfaces of the blocks facing the adjacent mould surfaces 32. 48 are crushed and moulded to the surface shape of the panelled door.

The curable material of the upper and lower sheets 44 and 34 flow into the adjacent foam blocks 42, 36 to form a mechanical bond. Curing of the curable material takes place in the heated mould so that the upper and lower sheets 44 and 34 form skins bonded to the upper and lower blocks.

Once cure is complete after a few minutes, the formed door is released from the mould.

Thus it can be seen how a door can be made in a single pressing operation.

In an alternative example, the lower block 36, the reinforcement 38 and the upper block 40 are provided as a single unit.

In some examples, the mould surface may have surface pattern to form a surface pattern on the outer surface of the skin. For example, where the mould comprises aluminium material, the aluminium mould having a woodgrain surface pattern may be formed by moulding the aluminium material directly on a master comprising real wood. Thus the surface pattern may comprise a genuine woodgrain pattern rather than a simulated pattern.

Figure 9:
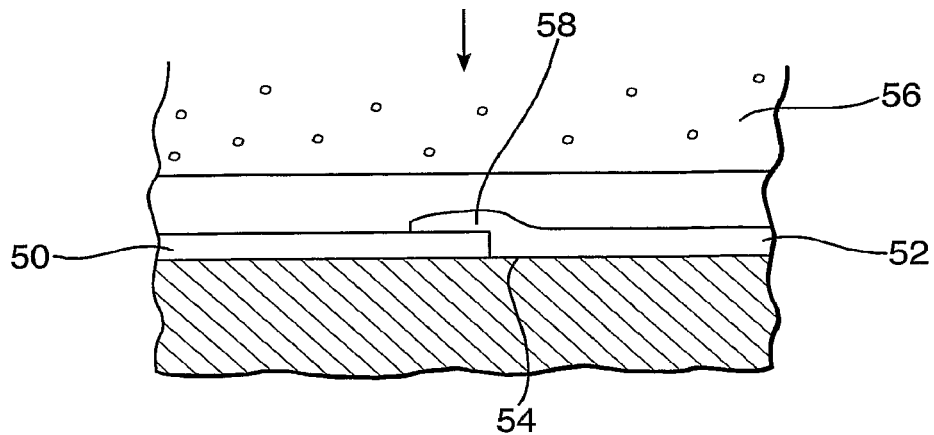
FIGS. 9 to 11 illustrate further examples of forming composite products.

FIG. 9 shows an arrangement in which overlapping sheets 50, 52 of curable material are placed on the mould surface 54. In this example, the open cell substrate 56 can be pressed directly onto the region of overlap 58 without loss of product quality at the overlap region 58. During the pressing process, the excess material at the overlap region 58 flows into the substrate 56.

Figure 10:
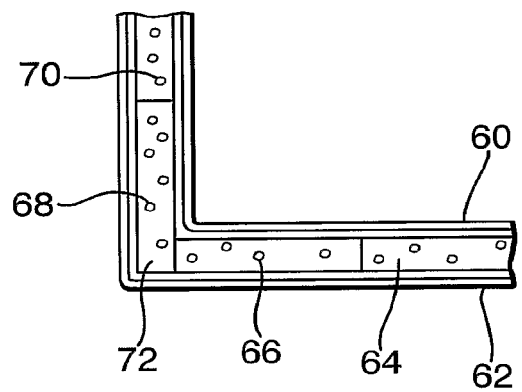

FIG. 10 shows how the substrate material may be provided as a plurality of blocks between the sheets of the curable composition 60, 62. The blocks 64, 66, 68, 70 may be butted up together linearly, or may form a "corner" 72 which can be successfully retained during the pressing step. It has been found that in many examples, the flow of the material into the substrate during pressing is sufficient to give good mechanical strength of the resulting composite, even where a plurality of blocks of the substrate are used.

Figure 11:
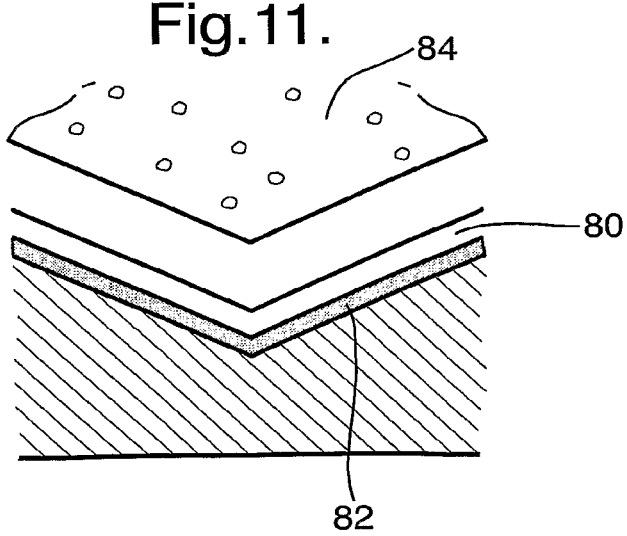

FIG. 11 shows further the formation of a composite product including a corner having a skin extending over the corner. One or more sheets of curable material 80 are inserted in a suitably shaped mould 82 and a shaped block of substrate 84 is pressed into the mould to form the corner.

Figure 12A:
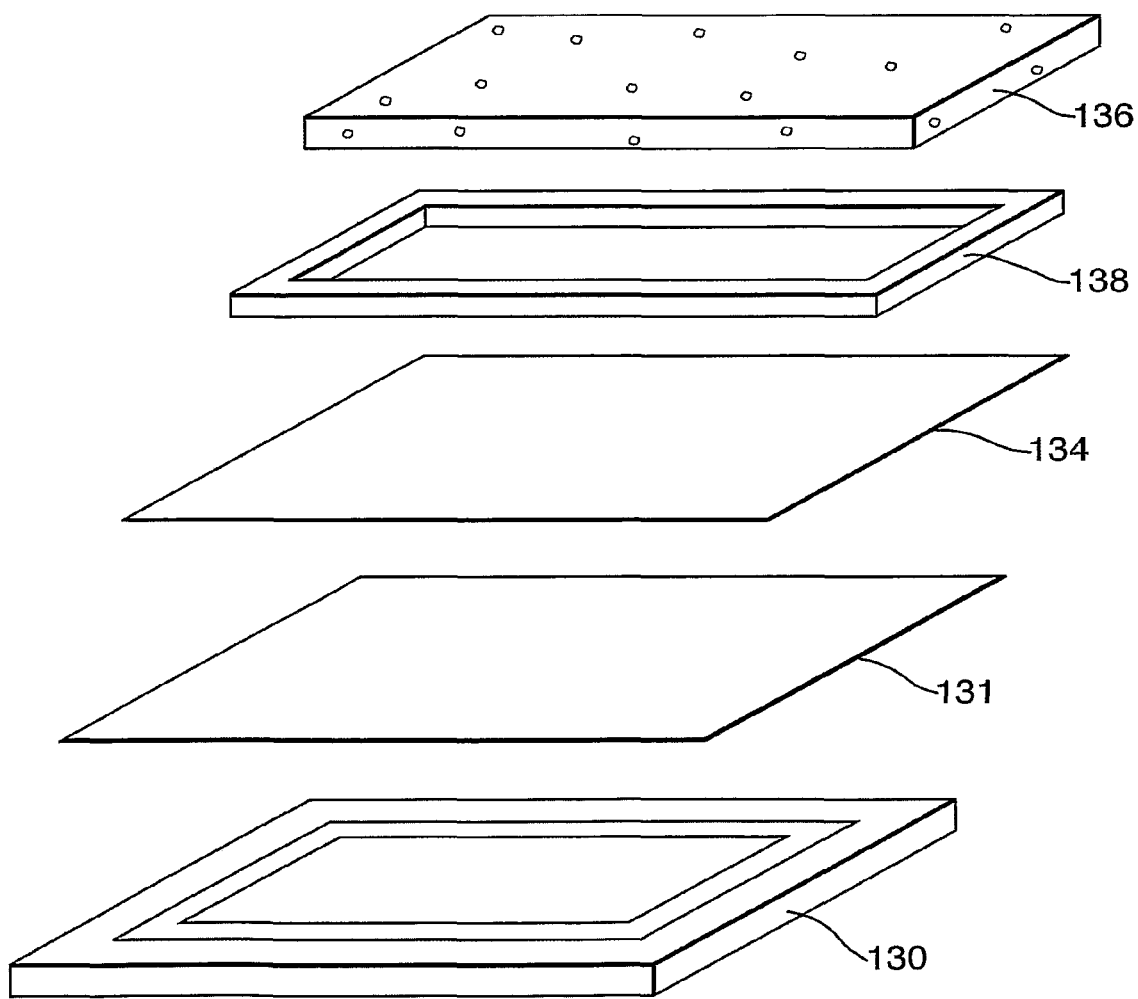
FIGS. 12*a* to *c* illustrate a method of forming a composite product according to a further example.
Figure 12B:
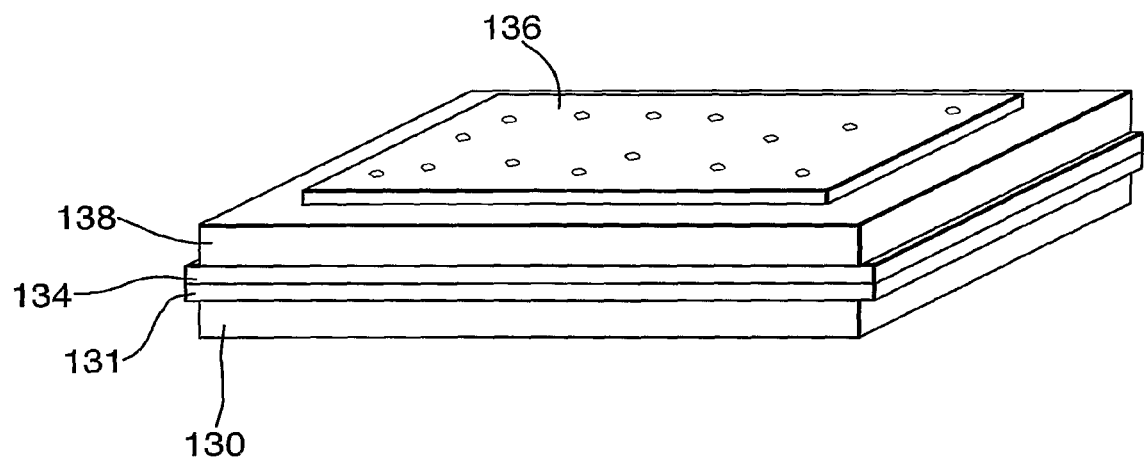
Figure 12C:
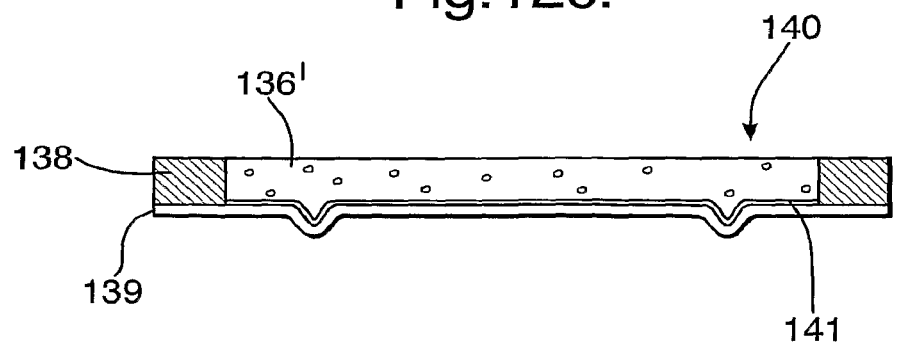

FIGS. 12*a* to *c* show a further example of a method of forming a composite product. Here, a panel is being formed.

A lower mould 130 is provided which has a moulding surface having the required contours for forming the desired surface profile for the panel to be formed.

The lower mould is located at an assembly station and the elements of the panel to be formed are loaded onto the mould 130.

The moulding surface may first be cleaned using any suitable cleaning materials. The components to be moulded are then loaded onto the mould 130.

Immediately onto the moulding surface of the mould 130 is placed a veil 131. In this example, the veil 131 is sized so as to fit to the mould surface with little overlap, but the veil may be oversized, in which case trimming may be required after moulding.

Onto the veil 131 is placed a sheet of SMC 134. Again, in this example, the size of the sheet of SMC 134 is so that it is similar to that of the moulding surface, but the SMC sheet may be oversized in which case some finishing may be required after moulding.

A frame 138 is then placed onto the SMC 134 and a foam block 136 is inserted into the frame 138.

A perspective view of the assembled components is shown in FIG. 12*b*. In FIG. 12*b*, the thicknesses of the various components are not shown to scale, for clarity.

The mould 130 supporting the components is then placed onto a heated lower press platen in a press. In this example, the temperature of the lower platen is chosen so that the mould temperature during moulding is about 140 degrees C.

An upper platen is then lowered towards the lower platen in the press and pressure applied to effect the moulding operation and form the moulded composite product 140.

FIG. 12*c* shows schematically a cross sectional view of the resulting moulded composite product 140. For clarity, the relative thicknesses of the various components are not shown to scale. It is seen from FIG. 12*c* that a composite skin 139 has been formed on a surface of the product. The composite skin 139 comprises the cured SMC layer and also the veil 131 material. Inspection indicates that the resin of the SMC appears to have penetrated fully through the veil material to give a smooth glossy outer surface while the filler material in the SMC (for example the glass fibres) have been captured beneath the veil.

A boundary layer 141 is also seen between the composite skin 139 and the compressed foam core 136. In this layer 141, the resin of the SMC appears to have penetrated the foam, for example by passing into the open cell structure of the foam core 136. This is seen to give good bonding between the composite skin 139 and the core 136'.

The composite product shown being formed in FIGS. 12*a* to *c* may be for example a precursor for a panel or door. The finished panel or door may be formed by attaching two similar precursors together to give a double skinned panel or door. It will be seen that alternatively the panel or door might be made in a single moulding step, for example as described above in relation to FIG. 8.

For example, a layered product could be provided for moulding which comprised, on a lower moulding surface, a first veil, an SMC layer, a foam core (with any frame or other components required), a second SMC layer and second veil. An upper mould surface would be pressed onto the second veil and pressure applied to mould a full panel or door in one piece.

Without wishing to be bound by any particular theory, the veil can be provided as a barrier between the filler material and the product surface to improve the surface finish of the composite product in certain arrangements. It is also thought that the presence of a veil can reduce flow of the matrix material in the plane of the mould, thus improving the appearance and other features of the moulded product in some arrangements.

In the present example, the SMC includes glass fibres.

It is to be noted that in some of the preferred examples, there is no requirement for the surface of the mould to be treated before the application of the components for moulding, for example the SMC, and veil if required. In particular, in some examples, there will be no requirement for the application of a dye to the mould, liquid resin, and/or other surface treatments. In many examples, any such components required may be included in the SMC material.

In other arrangements, the mould may be coated with a powder coating which then forms a coating on the product. This feature may be present in relation to any of the aspects of the invention. As an example, a powder coating can be applied electrostatically to the mould surface. Where the mould surface is heated, the powder coating melts or softens almost as soon as it is applied to the surface. For example the powder may include a polyester. The SMC or other matrix material (with or without integral reinforcing material) is then applied over the melted or softened powder coating. The melted or softened powder coating is then "sticky" on the surface of the mould and is thought to reduce movement of the matrix material during the moulding operation, which can in some cases give improved surface finish. In this example, the coating remains on the surface of the product, and provides a surface which is scratch and/or impact resistant. The powder coating can be coloured and thus provide a coloured coating to the product. The powder coating may be transparent or translucent and may have the appearance of a varnish on the surface of the product.

It will be understood that a very wide range of different composite products could be formed using methods as described herein. The application of the present invention is not restricted to the formation of, for example, doors Example of Preparation of SMC The SMC comprises a curable matrix and reinforcement.

To prepare the SMC, the matrix is prepared by mixing, for example a polyester resin with minerals and additives, for example including calcium carbonate and titanium dioxide together with appropriate pigments.

The matrix in the form of the resin paste is then applied to a bottom film carrier. Glass fibres as the reinforcement are then applied to the upper surface of the resin paste on the film carrier. A further layer of the resin paste is applied to sandwich the fibres between the layers of matrix. A top film is applied to the upper layer of the matrix. The resulting layered composition is subsequently compressed using a series of rollers to form a sheet of the sheet moulding compound between the film carriers. The material is rolled onto rollers and kept for at least 3 days at a regulated temperature of for example 23 to 27 degrees C. The resulting SMC can be compression moulded with heat. The shelf life of the SMC before use is usually a few weeks.

Foam

In some examples of the invention, the substrate comprises a foam having frangible cell walls. Preferably this term includes a foam for which under compression the foam crumbles by brittle fracture of the cell walls e.g. involving a clean fracture of the cell walls. Such a foam can retain a clear and substantially dimensionally accurate imprint in the crushed zone of an object through which the compressive force is applied. In general, it is preferred that the yield strength of the foam, which in this case means the minimum force required to cause the fracture of the cell walls and for the foam to crumble, is in the range of about 100 to 140 KPa (15 to 20 lbs/sq.in) more preferably at least 200 KPa (30 lbs/sq.in), since this provides useful impact resistance. In general, for a given foam composition, the greater the density, the greater the yield strength.

By using a substantially rigid plastics foam with frangible cell walls, mouldings with depressed zones of moulding detail can be readily formed by applying a layer to the foam core with sufficient pressure to cause the cell walls of the foam in the areas behind the depressed zones of the skin to be fractured whereby the foam is caused to conform to the contours of the skin in those zones by controlled localised crushing. Thus, air gaps between the skin and the substrate can be avoided and it is not necessary to pre-form the substrate in the form of complicated shapes. This is particularly advantageous since the presence of such air gaps in prior art products has in some cases contributed to their inability to resist changes in temperature.

For such a method, it is advantageous to use an open cell foam having frangible walls as pressing into a conventional foamed core such as of polystyrene is in some cases not successfully achieved because the resilience of the foam may cause distortion of the skins when the pressure is released.

In some examples of the invention, plastics foam are preferred which are substantially open-cell and rigid. However, the foam is advantageously selected to be of a high density relative to the foamed polystyrene conventionally used, e.g. a density of 75 kg/m$^3$ or above, since this gives a better feel to the panel and makes it sound and handle more like a conventional wooden panel. However, foams having lower densities may also be selected. Where a higher density is desirable, the foam may contain a filler, more preferably a finely divided inert and preferably inorganic solid. The filler may be selected such that it contributes to the panels ability to resist changes in temperature. In a particularly preferred embodiment, the filler is capable of absorbing moisture, e.g. as water of crystallisation.

While particular reference is made in the examples to open celled frangible foams, any suitable foam may be used. In some examples of the invention, foams which are substantially open cell are preferred; for example, a polyurethane foam, but in some examples the foam might not be open celled. Preferably in such example, the structure of the substrate is such that gases can be released from the mould. Where the foam is open celled, a foam that has an open-cell configuration at production is particularly suitable. A foam that also has frangible cell walls is particularly preferred where the panel or other product to be formed has depressed areas, such as to provide a moulding effect. However, as described herein, the moulding of the substrate can be provided by other methods, for example machining.

Any foam can be used some aspects of the invention. In many examples, rigid foam materials are preferred. For example a rigid foam could be used to form a panel having a substantially flat (unmoulded) surface which may or may not include surface pattern as described herein.

Alternatively, or in addition, the surface of the foam may be contoured. The contours could for example be formed on the surface of a foam block, for example by machining or any other suitable method. In such cases, the foam need not for example be a frangible or compressible foam.

Where a foam having frangible cell walls is used, the cell wall will fracture as pressure is placed on the foam by the application of the depressed areas of the mould. This localised increase in pressure will increase the pressure inside the cell, which will cause the gases to travel through the foam, and the cell to collapse thereby accommodating the depressed area of the skin.

One suitable foam is a rigid filled phenolic foam. One particularly suitable foam is that produced by effecting a curing reaction between:

(a) a liquid phenolic resole having a reactivity number (as defined below) of at least 1 and (b) a strong acid hardener for the resole, in the presence of:

(c) a finely divided inert and insoluble particulate solid which is present in an amount of at least 5% by weight of the liquid resole and is substantially uniformly dispersed through the mixture containing resole and hardener; the temperature of the mixture containing resole and hardener due to applied heat not exceeding 85_C and the said temperature and the concentration of the acid hardener being such that compounds generated as by-products of the curing reaction are volatilised within the mixture before the mixture sets whereby a foamed phenolic resin product is produced.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and substituted, usually alkyl substituted, derivatives thereof provided that the three positions on the phenolic benzene ring o- and p- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required but the cured products will be less highly cross-linked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active H atoms (dihydric compound) that will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, e.g. ethylene glycol, propylene glycol, propane-1,3-diol, butane-1,4-diol and neopentyl glycol. Particularly preferred diols are poly-, especially di-, (alkylene ether) diols e.g. diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2-6 atoms between OH groups.

The resole may comprise a solution of the phenol/aldehyde reaction product in water or in any other suitable solvent or in a solvent mixture, which may or may not include water. Where water is used as the sole solvent, it is preferred to be present in an amount of from 15 to 35% by weight of the resole, preferably 20 to 30%. Of course the water content may be substantially less if it is used in conjunction with a cosolvent. e.g. an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66-67% aqueous solution of p-toluene sulfonic acid at 60 degreesC. The test involves mixing about 5 ml of the resole with the stated amount of the p-toluene sulfonic acid solution in a test tube, immersing the test tube in a water bath heated to 60 degreesC and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5-20 poises. Below 5 Poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85 degrees C.

If the temperature of the mixture exceeds 85 degrees C. before addition of the hardener, it is difficult or impossible thereafter to properly disperse the hardener through the mixture because of incipient curing. On the other hand, it is difficult, if not impossible, to uniformly heat the mixture above 85 degrees C. after addition of the hardener.

Increasing the temperature towards 85 degrees C. tends to lead to coarseness and non-uniformity of the texture of the foam but this can be offset at least to some extent at moderate temperatures by reducing the concentration of hardener. However at temperatures much above 75 degrees C. even the minimum amount of hardener required to cause the composition to set is generally too much to avoid these disadvantages. Thus, temperatures above 75 degrees C. are preferably avoided and preferred temperatures for most applications are from ambient temperature to about 75 degrees C. The preferred temperature range appears to depend to some extent on the nature of the solid (c). For most solids it is from 25 to 65 degrees C. but for some solids, in particular wood flour and grain flour, the preferred range is 25 to 75 degrees C. The most preferred temperature range is 30 to 50 degrees C. Temperatures below ambient, e.g. down to 10 degrees C. can be used, if desired, but no advantage is gained thereby. In general, at temperatures up to 75 degrees C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependent on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. Where the preferred temperature range is 25-75 degrees C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25 degrees C. or resoles having a reactivity number below 10, it may be necessary to use more hardener.

It may be necessary to make some adjustment of the hardener composition in accordance with the nature, especially shape and size, of the mould and this can be established by experiment.

By suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor that controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily $CH_2O$ and/or $H_2O$, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the concentration of low grade ores in metallurgy. In any event, the presence of the solid is essential to the formation of the product. To achieve the desired effect, the solid should be present in an amount of not less than 5% by weight based on the weight of the resole.

Any finely divided particulate solid that is insoluble in the reaction mixture is suitable, provided it is inert. The fillers may be organic or inorganic (including metallic), and crystalline or amorphous. Even fibrous solids have been found to be effective, although not preferred. Examples include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash.

The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

If a finely divided metal powder is included, electrically conducting properties can be obtained. The metal powder is preferably used in amounts of from 50 to 250 parts per 100 parts by weight of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

Conventional blowing agents may also be included to enhance the foaming reaction, e.g. low boiling organic compounds or compounds which decompose or react to produce gases.

The foam-forming compositions may also contain dehydrators, if desired.

A preferred method of forming the foam-forming composition comprises first mixing the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid and then heating the mixture. Preferably the solid is added to the resole just before the addition of the hardener. Alternatively, the mixture of resole, solid and hardener may be prepared and the whole mixture then heated, e.g. by short wave irradiation, preferably after it has been charged to a mould. A conventional radiant heat oven may also be used, if desired, but it is difficult to achieve uniform heating of the mixture by this means.

Preferably, the foam has a density in the range 75 to 500 $kg/m^3$, more preferably 100 to 400 $kg/m^3$ and most preferably 100 to 250 $kg/m^3$. Foam cell size is also important because up to a limit the larger the size of the cell for a given density, the thicker will be the walls and hence the greater the physical strength of the foam. However if the cell size is too large, the strength begins to suffer. Preferably, the cell size is in the range of 1 to 3 mm.

It will be understood that the present invention has been described above purely by way of example, and modification of detail can be made within the scope of the invention.

In particular, the examples above have been described in relation to the manufacture of panels, in particular the manufacture of doors. However, it should be appreciated that the invention has very wide application including other products. Indeed it is envisaged that an extremely wide range of products could be made in accordance with methods of the present invention. Many moulded products could be made using the methods of the present invention, even where those products may currently be manufactured using different materials (for example wood, metal, porcelain) at present. In addition to building products, it is envisaged that for example, the invention could find application to vehicle parts and fittings, casings for electrical equipment and many household items of which furniture, picture frames, chairs, tables, lamp bases, vases, bowls are only a few examples.

The methods described may, for example, be used to produce products for sports, or other leisure activities. For example, methods described might be used for forming rackets, bats, or other products, for example skis. Products made by the methods may find application for example in the aerospace, aircraft or other vehicle fields. For example, the methods described could be used to form panels for use in aircraft skins and/or as internal panels in the aircraft. The products might find application as blades, for example for wind turbines.

Each feature disclosed in the description, and (where appropriate) the claims and drawings may be provided independently or in any appropriate combination.

The invention claimed is:

1. A composite product comprising:
a layer of sheet-form moulding material; and
a frangible substrate,
the sheet-form material being bonded to a surface of the substrate; and
wherein the substrate comprises a substantially open-celled structure, and a portion of the sheet-form material is located within the open-cell structure of the substrate, and further wherein the substrate is at least partially crushed.

2. A composite according to claim 1, wherein the substrate comprises a foam material.

3. A composite according to claim 1, wherein the substrate forms a part of a final product derived from the composite product.

4. A composite according to claim 1, wherein the sheet-form material comprises a thermosetting material.

5. A composite according to claim 4, wherein the thermosetting material is fully cured.

6. A composite according to claim 1, further comprising a veil bonded to the sheet-form moulding material.

7. A composite according to claim 6, wherein the veil is substantially pervious to a component of the moulding material.

8. A composite according to claim 7, wherein the veil comprises a non-woven material.

9. A composite according to claim 1, wherein a further layer of sheet-form moulding material is bonded to an opposing surface of the substrate, sandwiching the substrate between the two layers of sheet-form material.

10. A composite according to claim 1, wherein the sheet-form moulding material includes reinforcing fibres.

11. A composite according to claim 1, wherein the sheet-form material includes a mat, or fabric of fibres.

12. A composite according to claim 1, wherein the sheet-form material includes one or more of carbon fibres, glass fibres and aramid fibres.

13. A composite according to claim 1, wherein the sheet-form material includes a mesh or network of fibres.

14. A composite according to claim 1, wherein the layer of sheet-form moulding material comprises SMC (sheet moulding compound).

15. A composite according to claim 1, wherein the layer of sheet-form moulding material comprises polyester, vinyl ester, epoxy, phenolic, or a polyimide.

16. A composite according to claim 1, wherein the layer of sheet-form material includes an impregnated fibre composite material.

17. A composite according to claim 1, wherein the sheet-form material layer is a substantially single thickness.

18. A composite according to claim 1, comprising a plurality of layers of sheet-form material.

19. A composite according to claim 1, further including a layer of reinforcing fibres between the substrate and the layer of sheet-form material.

20. A composite according to claim 19, wherein the layer of reinforcing fibres is in a region between the substrate and the layer of sheet-form material.

21. A composite according to claim 1, wherein the substrate comprises phenolic resin.

22. A composite according to claim 1, wherein the substrate comprises a finely divided filler material, which may be organic or inorganic (including metallic).

23. A composite according to claim 1, wherein the composite is shaped, such as by a mould.

* * * * *